(12) United States Patent
Stoeger et al.

(10) Patent No.: US 10,584,899 B2
(45) Date of Patent: Mar. 10, 2020

(54) DEVICE FOR ANCHORING AN INFLATABLE CONCENTRATOR CUSHION

(71) Applicant: HELIOVIS AG, Wiener Neudorf (AT)

(72) Inventors: Elmar Stoeger, Wiener Neudorf (AT); Felix Tiefenbacher, Wiener Neudorf (AT)

(73) Assignee: HELIOVIS AG, Wiener Neudorf (AT)

( * ) Notice: Subject to any disclaimer, the term of this patent is extended or adjusted under 35 U.S.C. 154(b) by 389 days.

(21) Appl. No.: 15/523,320

(22) PCT Filed: Oct. 30, 2015

(86) PCT No.: PCT/AT2015/050275
§ 371 (c)(1),
(2) Date: Apr. 28, 2017

(87) PCT Pub. No.: WO2016/065386
PCT Pub. Date: May 6, 2016

(65) Prior Publication Data
US 2017/0314818 A1    Nov. 2, 2017

(30) Foreign Application Priority Data

Oct. 31, 2014  (AT) ............................... A 50789/2014

(51) Int. Cl.
*F24S 20/50*    (2018.01)
*F24S 25/10*    (2018.01)
(Continued)

(52) U.S. Cl.
CPC .............. *F24S 20/50* (2018.05); *F24S 10/40* (2018.05); *F24S 23/74* (2018.05); *F24S 25/10* (2018.05);
(Continued)

(58) Field of Classification Search
CPC .......... F24S 30/425; F24S 23/74; F24S 25/10; F24S 10/40; F24S 20/50; F24S 2030/134;
(Continued)

(56) References Cited

U.S. PATENT DOCUMENTS

| 2010/0065045 A1 | 3/2010 | Jennings |
| 2010/0229850 A1 | 9/2010 | Sankrithi |

(Continued)

FOREIGN PATENT DOCUMENTS

| CH | 704394 A2 | 7/2012 |
| ES | 2446890 A1 | 3/2014 |

(Continued)

OTHER PUBLICATIONS

ISA European Patent Office, International Search Report Issued in Application No. PCT/EP2015/075206, dated Dec. 15, 2015, WIPO, 6 pages.

(Continued)

*Primary Examiner* — Alfred Basichas
(74) *Attorney, Agent, or Firm* — McCoy Russell LLP

(57) ABSTRACT

The invention relates to a device for anchoring an inflatable concentrator cushion, which has a light-permeable entry window for coupling in solar radiation and a reflector film, which sub-divides the concentrator cushion into at least two hollow spaces, for the concentration of solar radiation in an absorber, comprising a pivoting apparatus for pivoting the concentrator cushion, in particular about its longitudinal axis, and comprising an anchoring apparatus for the pivoting apparatus.

18 Claims, 6 Drawing Sheets

(51) Int. Cl.
*F24S 30/425* (2018.01)
*F24S 23/74* (2018.01)
*F24S 10/40* (2018.01)
F24S 25/00 (2018.01)
F24S 30/00 (2018.01)

(52) U.S. Cl.
CPC ....... *F24S 30/425* (2018.05); *F24S 2025/011* (2018.05); *F24S 2030/134* (2018.05); *F24S 2030/15* (2018.05); *Y02E 10/45* (2013.01); *Y02E 10/47* (2013.01)

(58) Field of Classification Search
CPC . F24S 2030/15; F24S 2025/011; Y02E 10/47; Y02E 10/45
See application file for complete search history.

(56) References Cited

U.S. PATENT DOCUMENTS

2011/0100358 A1 5/2011 Perisho
2011/0277815 A1 11/2011 Sankrithi

FOREIGN PATENT DOCUMENTS

| WO | 2009117840 A2 | 10/2009 |
| WO | 2011106811 A2 | 9/2011 |
| WO | 2012006255 A2 | 1/2012 |
| WO | 2012083321 A1 | 6/2012 |
| WO | 2012145774 A2 | 11/2012 |
| WO | 2013074790 A1 | 5/2013 |

OTHER PUBLICATIONS

ISA European Patent Office, International Search Report Issued in Application No. PCT/AT2015/050275, dated Feb. 11, 2016, WIPO, 4 pages.
ISA European Patent Office, International Search Report Issued in Application No. PCT/EP2015/075198, dated Mar. 7, 2016, WIPO, 6 pages.
ISA European Patent Office, International Search Report Issued in Application No. PCT/EP2015/075197, dated Mar. 23, 2016, WIPO, 6 pages.
Stoeger, Elmar et al., "Device for the Concentration of Solar Radiation, Comprising an Inflatable Concentrator Cushion," U.S. Appl. No. 15/523,243, filed Apr. 28, 2017, 43 pages.
Stoeger, Elmar et al., "Device for the Concentration of Solar Radiation, Comprising an Inflatable Concentrator Cushion," U.S. Appl. No. 15/523,278, filed Apr. 28, 2017, 45 pages.
Binder, Leopold et al., "Apparatus for Concentrating Solar Radiation with Inflatable Concentrator Cushion," U.S. Appl. No. 15/523,133, filed Apr. 28, 2017, 45 pages.
International Bureau of WIPO, International Preliminary Report on Patentability Issued in Application No. PCT/AT2015/050275, dated May 11, 2017, WIPO, 7 pages.

DEVICE FOR ANCHORING AN INFLATABLE CONCENTRATOR CUSHION

CROSS-REFERENCE TO RELATED APPLICATIONS

The present application is a U.S. National Phase of International Patent Application Serial No. PCT/AT2015/050275, entitled "DEVICE FOR ANCHORING AN INFLATABLE CONCENTRATOR CUSHION," filed on Oct. 30, 2015. International Patent Application Serial No. PCT/AT2015/050275 claims priority to Austrian Patent Application No. A 50789/2014, filed on Oct. 31, 2014. The entire contents of each of the above-cited applications are hereby incorporated by reference for all purposes.

TECHNICAL FIELD

The invention further relates to a device for the concentration of solar radiation in an absorber comprising an inflatable concentrator cushion, which comprises a light-permeable entry window for coupling in solar radiation and a reflector film, which sub-subdivides the concentrator cushion into at least two hollow spaces, for the concentration of solar radiation in an absorber, and comprising a device for retaining the inflatable concentrator cushion.

BACKGROUND AND SUMMARY

A generic device for the concentration of solar radiation in an absorber has become known from WO 2012/145774. The device has an inflatable concentrator, which is formed by an elongated, substantially cylindrical tubular sleeve of a plurality of film elements. On the top side, the sleeve has a transparent entry window for the solar radiation to pass through. Provision is further made for a reflector film, by means of which the cushion is sub-divided into at least two separate pressure chambers. The reflector film has a reflecting surface, by means of which the coupled-in solar radiation is focused in the direction of an absorber. For anchoring the concentrator, provision is made for an anchoring frame. The anchoring frame has a tracking system, so that the cushion-shaped concentrator can track the sun's path. The tracking system has a plurality of tracking rings, which surround the concentrator cushion and which are rotatably supported by means of rolling devices. The tracking rings are supported on bottom-side base elements.

Tests showed that the tracking rings support on the bottom are subjected to high tilting moments during operation, in particular as a result of wind loads. To withstand the loads during operation, the tracking rings thus had to be embodied so as to be comparatively massive. However, in the case of the previous embodiment, it was not possible to keep the external loads completely away from the tubular concentrator. Due to the external influences, deformation states of the concentrator were observed during operation. Such deformations, however, could shorten the service life of the concentrator or could cause damages, respectively. It is even more significant, however, that the influences on the geometry of the curved reflector film can lower the efficiency of the concentrator.

US 2011/0100358 A1 describes a parabolic solar panel, which can track the sun's position by means of pivoting rings. The pivoting rings, however, are supported on rollers—as in the case of the above-specified prior art. ES 2 446 890 only shows a further solar panel comprising a bottom-side support of the pivoting rings. US 2010/0065045 A1 describes a further solar panel comprising pivoting rings, which are supported on rollers. According to this, these embodiments have the same disadvantages or limitations, respectively, as the prior art of WO 2012/145774.

It is thus the object of the invention at hand to eliminate or to ease, respectively, the disadvantages of the prior art. The invention thus in particular has the goal of creating a device of the above-specified type, which has a simple design, is stable and can be produced cost-efficiently, by means of which the absorption of external loads, in particular of wind loads, is improved in order to further increase the efficiency of the concentrator.

This object is solved by means of a device for retaining a concentrator cushion comprising the features of claim 1 and a device for the concentration of solar radiation comprising the features of claim 18. Preferred embodiments are specified in the dependent claims.

According to the invention, the anchoring apparatus comprises a suspension apparatus for suspending the pivoting apparatus.

In contrast to the prior art, the pivoting apparatus and retaining apparatus for the concentrator cushion is thus no longer supported on the bottom from the underside, but is suspended on a suspension apparatus on the top side. According to this, the pivoting apparatus, to which the concentrator cushion is secured (mounted) in the operating state, is supported substantially completely by the suspension apparatus. The pivoting apparatus or rotating apparatus, respectively, is set up to pivot the concentrator cushion, which consists of flexible (plastic) film elements, preferably about its longitudinal axis. For the purposes of this disclosure, the suspension of the pivoting apparatus means that the securing locations between the suspension apparatus and the pivoting apparatus are arranged only above a plane, which has the center of mass of the pivoting apparatus. The terms "top" and "bottom" hereby refer to the operating position of the device. The invention in particular has the advantage that the external loads, such as wind forces, can be absorbed particularly efficiently and can be transferred to a foundation at the location. It is advantageous in particular that the cushion-shaped or tubular concentrator, respectively, can be kept largely free from external influences. The concave curvature of the reflector film between the upper and the lower pressure chamber of the concentrator, which preferably has a substantially cylindrical cross section, can thus be accurately maintained, so that the solar radiation is focused on the absorber with a high efficiency. The embodiment according to the invention is further advantageous to the effect that the pivoting apparatus can be embodied so as to be slimmer than in the prior art. Material costs can thus be saved. The level of clouding of the reflector film is furthermore reduced, whereby the efficiency can be further increased.

For suspending the pivoting apparatus for the concentrator cushion, it is favorable, if the suspension apparatus comprises at least one support frame, preferably a plurality of support frames, which are arranged so as to be spaced apart in the longitudinal direction of the concentrator cushion, wherein the at least one support frame in each case comprises at least a first frame element on the one longitudinal side of the concentrator cushion and a second frame element on the other longitudinal side of the concentrator cushion. According to this, the first frame element and the second frame element are arranged on the opposite longitudinal sides of the concentrator cushion, i.e. laterally next to the concentrator cushion. The first frame element has a first securing location for the pivoting apparatus on the one longitudinal side of the concentrator cushion, wherein the second frame element has a second securing location for the pivoting apparatus on the other longitudinal side of the concentrator cushion. The securing locations of the frame elements are arranged above the center of mass of the pivoting apparatus. Support apparatuses are not provided on the bottom side of the concentrator, so that the pivoting apparatus is suspended only on the frame elements. According to this, the weight of the pivoting apparatus, in the assembled state also the weight of the further components, such as concentrator cushion, absorber suspension and absorber, is supported substantially completely by the support frame. Provision is preferably made for a plurality of such support frames, the frame elements of which are arranged laterally next to the concentrator cushion, in particular at regular intervals. The term "longitudinal side" hereby refers to the fact that the concentrator cushion has an elongated design comprising two longitudinal sides. On the front and rear end, the concentrator cushion additionally has an end piece each, by means of which the air-filled hollow spaces or pressure chambers, respectively, are closed in a substantially air-tight manner. Advantageously, the support frame can be produced very well from standard profiles, which already leads to significant cost advantages in the case of small quantities.

To increase the stability of the suspension apparatus, it is advantageous, if the support frame comprises a third frame element above the concentrator cushion, which connects the first frame element on the one longitudinal side of the concentrator cushion to the second frame element on the other longitudinal side of the concentrator cushion. In the case of this embodiment, the support frame thus extends from the one longitudinal side of the concentrator cushion over the top side of the concentrator cushion to the other longitudinal side of the concentrator cushion, so that the concentrator cushion is arranged completely inside the support frame in the assembled operating state. The pivoting apparatus is preferably suspended on the bottom side of the support frame. According to this, the pivoting apparatus is preferably framed substantially completely by the support frame. This embodiment turned out to be particularly favorable for absorbing the forces, for example wind forces, which appear during operation.

The production costs can be reduced, if the first frame element and/or the second frame element is assembled of at least a first straight frame part and a second straight frame part, which are arranged relative to one another at an angle. The second frame part thus connects to the first frame part at an angle. The second frame part is preferably arranged to as to be inclined towards the concentrator cushion. The support frame thus runs close to the concentrator cushion, which has a round cross section, whereby the stability of the arrangement is increased. The third frame element is preferably also embodied in a straight line, wherein the third frame element in particular extends in a substantially horizontal plane above the pivoting apparatus with the concentrator cushion.

To anchor the concentrator to the ground, it is favorable, if the first frame part is arranged substantially vertically in the operating state, wherein the bottom end of the first frame part is anchored to the ground of the location in a base element.

The first frame element and/or the second frame element and/or the third frame element are preferably embodied as profile elements, in particular as I-profiles, which extend in a plane substantially vertically to the longitudinal direction of the concentrator cushion. In the direction of their longitudinal extension, the profile elements have the same cross section. Such profile elements are known in the construction industry in a variety of embodiments, for example comprising an I-shaped cross section. The production costs can thus be kept low.

According to a particularly preferred embodiment, the suspension apparatus comprises at least two support frames, which are connected to one another via at least one tension element (clamping element), in particular a rope element. This embodiment is in particular associated with the advantage that the individual support frames can be embodied so as to be slim, wherein a high stability of the arrangement is nonetheless attained by the bracing between the support frames. It is also advantageous hereby that the support frames of profile elements do not cause a noteworthy clouding of the concentrator cushion, which would lower the efficiency of the concentrator. Advantageously, this embodiment of the suspension apparatus also offers only little resistance to wind forces, whereby damages to the system can be prevented. The support frames are preferably arranged substantially vertically to the longitudinal direction of the concentrator cushion, wherein the tension elements effect a bracing of the support frames in the longitudinal direction of the concentrator cushion.

To evenly brace the anchoring apparatus in the longitudinal direction of the concentrator cushion, it is advantageous, if the at least two support frames are connected to one another on both longitudinal sides of the concentrator cushion via at least one tension element each, preferably in each case via at least two tension elements, which are braced crosswise.

To attain a bracing of the suspension apparatus, it is favorable, if at least one support frame, in particular a front support frame, based on the longitudinal direction of the concentrator cushion, and/or a rear support frame, based on the longitudinal direction of the concentrator cushion, is braced against a bottom element via a further tension element. Tension elements are preferably guided on both longitudinal sides of the concentrator cushion from a bottom element on the front side of the concentrator via the individual support frames to a bottom element on the rear side of the concentrator.

To make it possible for the concentrator cushion to track the sun's path, i.e. the current position of the sun above the location, it is advantageous, if the pivoting apparatus comprises at least one pivoting element, in particular a pivoting ring, which surrounds the concentrator cushion in its circumferential direction, wherein preferably a plurality of pivoting elements, in particular pivoting rings, which are spaced apart in the longitudinal direction of the concentrator cushion, are in each case suspended on a support frame of the suspension apparatus. Such pivoting rings or rotating rings, respectively, are known per se in the prior art, see, e.g., WO 2012/145774. In the prior art, however, the pivoting rings were supported on roller bearings on the bottom side. The disadvantages of this embodiment can be eliminated in that the pivoting rings are suspended on the suspension apparatus.

For the concentrator cushion to track the sun's path, it is advantageous, if provision is made between the suspension apparatus and the pivoting apparatus for a pivot bearing apparatus, in particular a roller bearing. Such roller bearings are known per se in the prior art, see, e.g., WO 2012/145774. The roller bearing has roller elements, which are in particular provided on a travelling crane. The roller elements are connected to a drive, wherein, in the driven state, the roller elements generate a torque, which effects a pivoting of the pivoting apparatus with the concentrator cushion about an axis, in particular about the longitudinal axis of the concentrator cushion, as a result of a frictional connection in response to the rolling on the pivoting apparatus.

To improve the application of force on the pivoting apparatus, the pivot bearing apparatus preferably comprises a first roller bearing on the first frame element of the suspension apparatus and a second roller bearing on the second frame element of the suspension apparatus. According to this, the drive force is transferred to the pivoting apparatus at at least two locations.

According to a particularly preferred embodiment, the pivoting apparatus comprises a guide element for the roller bearing, wherein provision is made for an outer roller element to roll on the top side of the guide element and for an inner roller element to roll on the inner side of the guide element. The inner roller element is hereby provided for the normal operation, while the outer roller element is set up to prevent a lifting of the concentrator cushion in response to stronger wind loads. The expressions "inside" and "outside" hereby refer to the radial extension of the concentrator cushion.

The pivoting apparatus preferably comprises at least one pivoting element comprising an I-shaped or T-shaped cross section, wherein an upper flange of the I-shaped or T-shaped pivoting element is embodied as guide element for the roller bearing. The pivoting element can thus be made of a standard part, whereby the production costs can be reduced, whereby the upper flange is simultaneously embodied as guide element for the roller bearing.

To shield the concentrator cushion if required, in particular if stronger wind loads appear, it is favorable if provision is made on the suspension apparatus for a covering apparatus, which can be transferred between a protective position, which at least partially covers the concentrator cushion, and a stowage position, which arranges the concentrator cushion so as to be substantially completely exposed. Preferably, one covering apparatus is in each case secured to adjacent support frames. The covering apparatus can have slat elements, which are arranged in a collapsed state in the stowage position and in an unfolded state in the protective position. In the protective position, the covering apparatus is preferably arranged substantially vertically. In the protective position, preferably only the lower part of the concentrator cushion is shielded, wherein the upper part of the concentrator cushion with the entry window is left open.

According to a particularly preferred embodiment, the pivoting apparatus is connected to a retaining apparatus for the concentrator cushion, which retaining apparatus comprises at least one longitudinal member (beam), in particular lattice truss, which extends in the longitudinal direction of the concentrator cushion. The longitudinal member preferably extends substantially across the entire length between opposite end pieces of the concentrator cushion. The forces acting on the concentrator cushion can thus be absorbed evenly and can be transferred via the pivoting apparatus and the anchoring apparatus. This embodiment has a significantly higher stability, in particular against wind forces, than the local securing locations provided in the prior art, see WO 2012/145774, between the pivoting rings and the concentrator cushion. It is particularly advantageous that influences on the curvature of the reflector film can be reduced by means of the arrangement of the longitudinal members, whereby the energy yield can be increased significantly.

To prevent undesired deformations of the concentrator cushion during operation, if possible, it is favorable if the retaining apparatus for the concentrator cushion comprises a first longitudinal member, in particular a first lattice truss, and a second longitudinal member, in particular a second lattice truss, wherein the first (upper) longitudinal member is connected to a top side of the concentrator cushion, the top side facing the solar radiation, and the second (lower) longitudinal member is connected to a bottom side of the concentrator cushion, the bottom side facing away from the solar radiation. According to this, the first longitudinal member is connected to a cover film of the concentrator cushion, which has the entry window, via a securing opening or passage opening, respectively, which is sealed on all sides. The absorber is suspended on the first longitudinal member. The second longitudinal member is connected to a bottom film of the concentrator cushion via a further securing-passage opening, which is sealed on all sides. The concentrator can thus be stabilized in the longitudinal direction. For sealing purposes on the securing openings, provision can be made for a keder system, wherein an example of such a keder system is shown in WO 2012/145774. Both longitudinal members are preferably arranged inside the concentrator cushion.

In the operating state, the concentrator cushion is assembled to the anchoring apparatus.

BRIEF DESCRIPTION OF THE FIGURES

The invention will be explained in more detail below by means of a preferred exemplary embodiment, to which the invention is not to be limited, however. In the drawing.

DETAILED DESCRIPTION

Figure 1A:
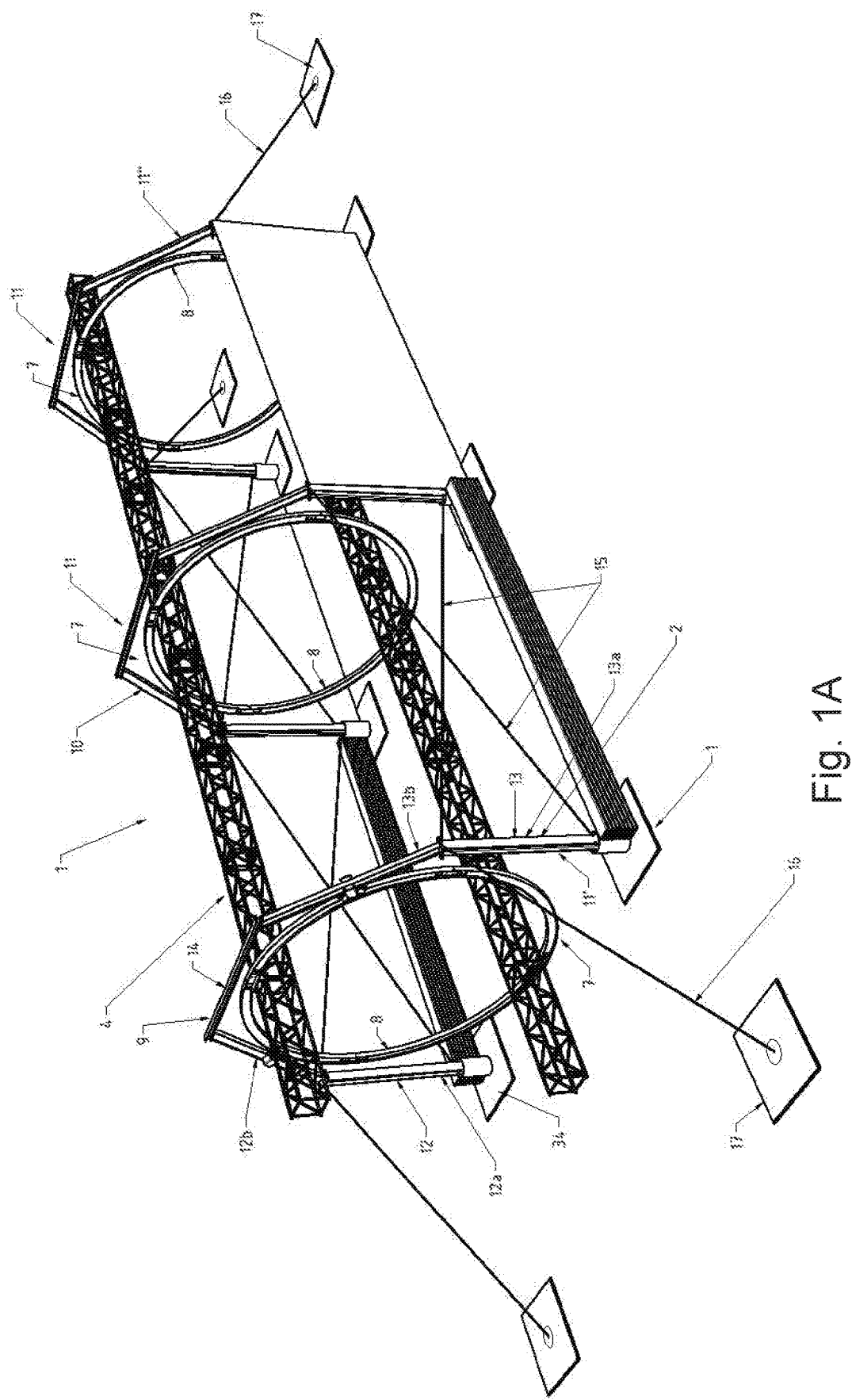
FIG. 1A shows a figurative view of a device according to the invention for retaining a concentrator cushion (see FIGS. 1B, 1C and FIG. 2), in the case of which a plurality of pivoting rings for pivoting the concentrator cushion are suspended on a support frame.
Figure 1B:
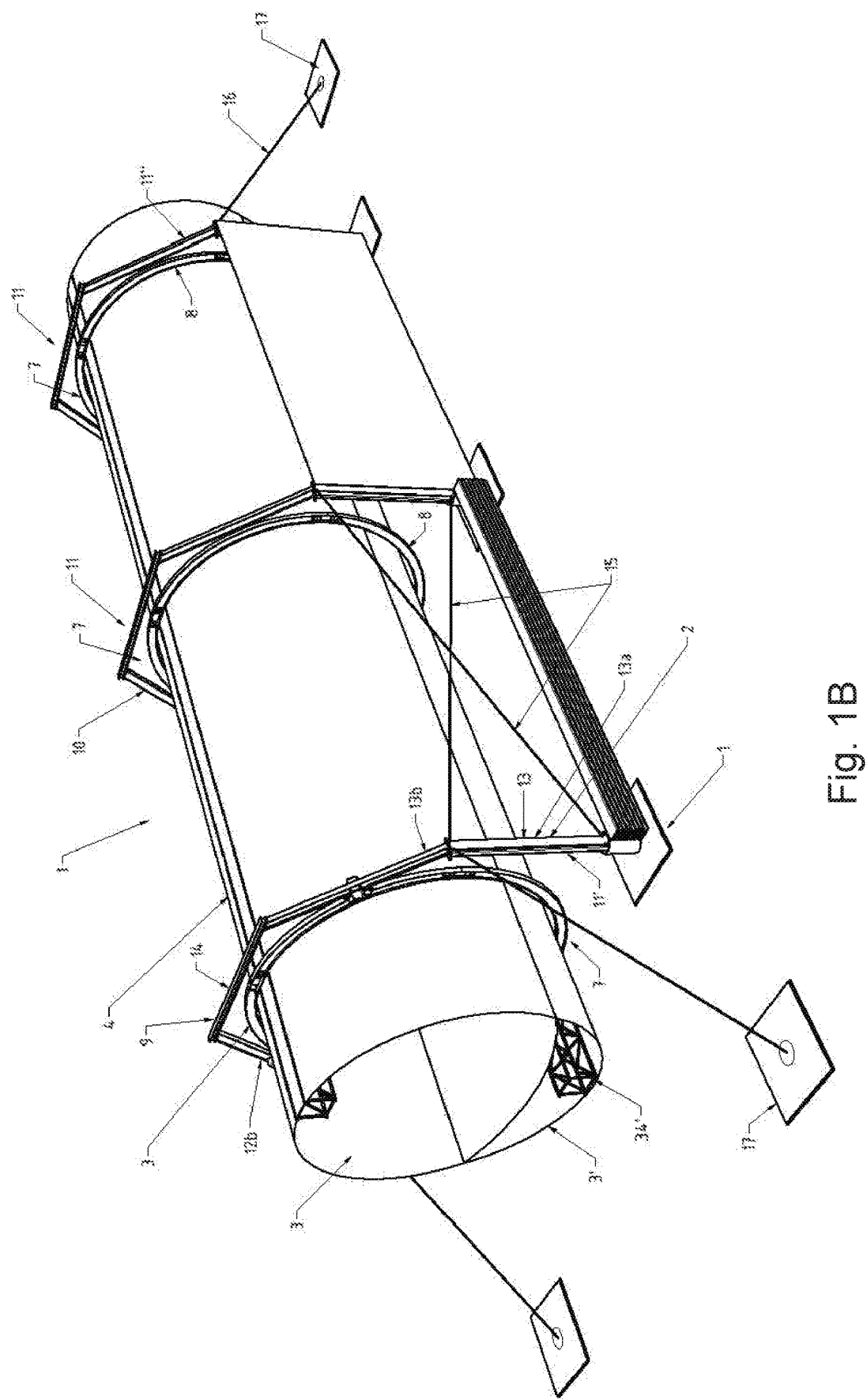
FIG. 1B shows a figurative view of the device according to the invention according to FIG. 1A, wherein the concentrator cushion (without the end pieces thereof) can additionally be seen in the assembled state and covering apparatus.
Figure 1C:
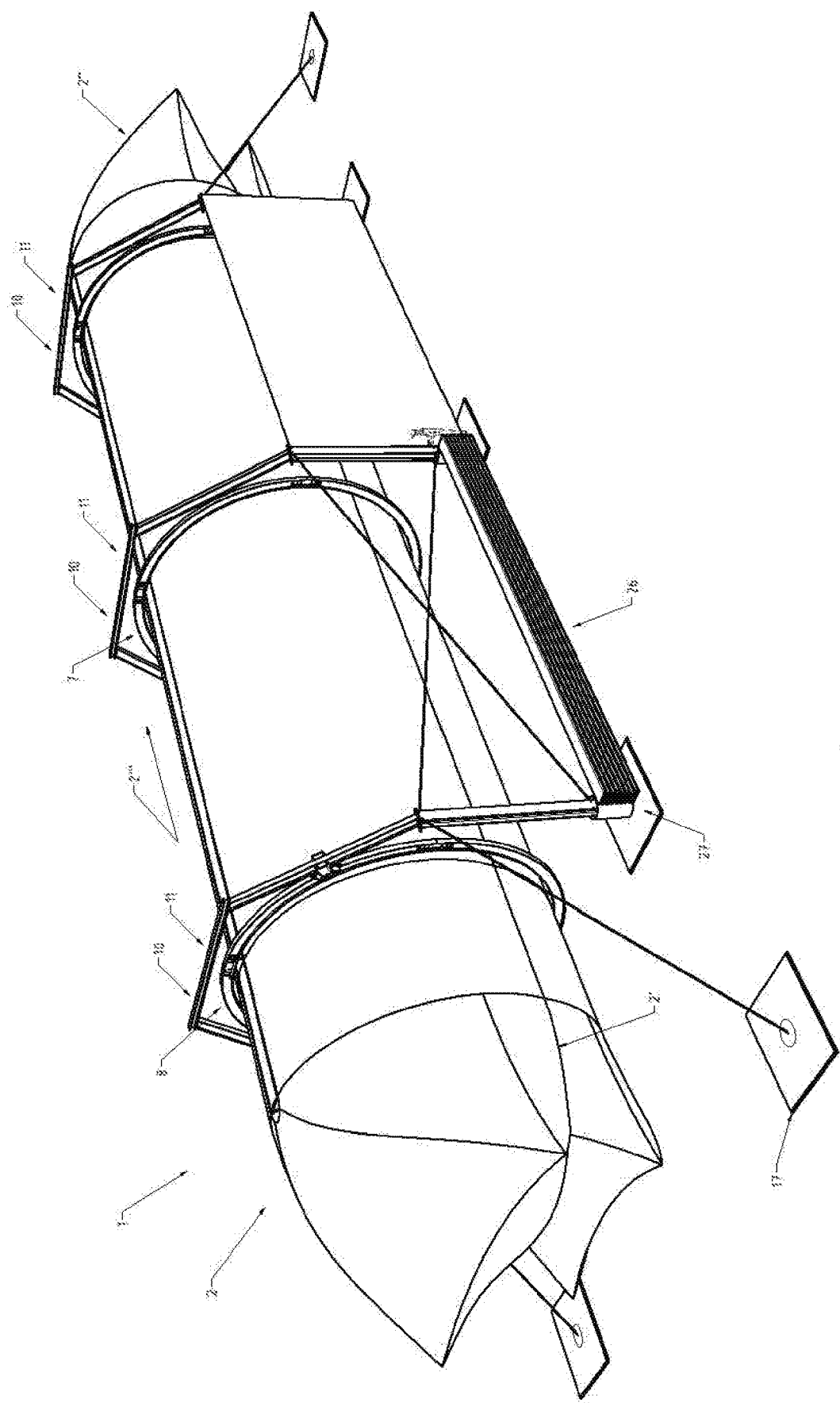
FIG. 1C shows a further figurative view of the device according to the invention according to FIG. 1B, wherein the concentrator cushion can be seen in the operating state, including the end pieces thereof.
Figure 2:
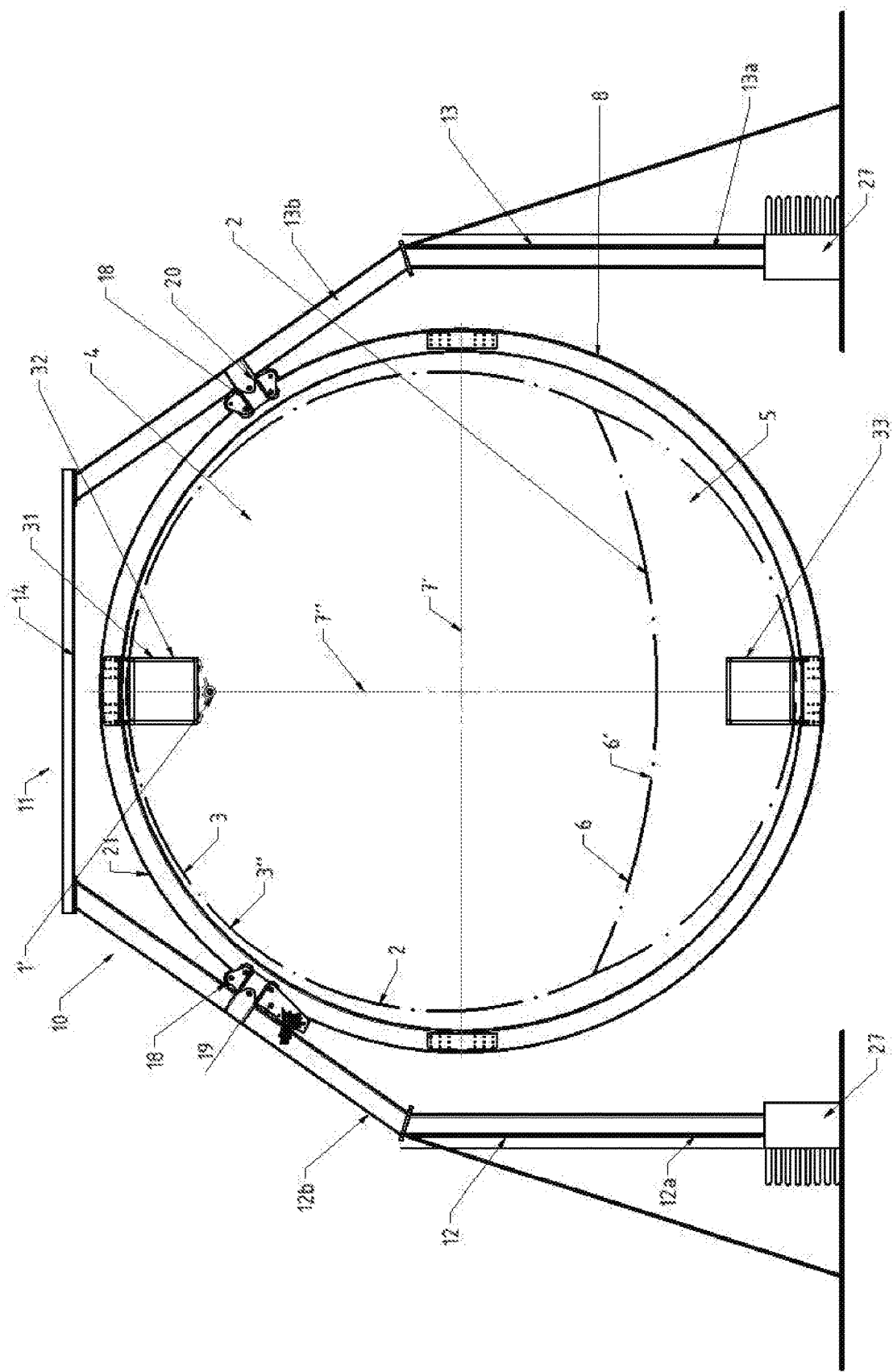
FIG. 2 shows a cross sectional view of the device according to FIGS. 1A to 1C, wherein the concentrator cushion can be seen in the assembled state.

FIGS. 1A to 1C shows a device 1 for retaining an inflatable concentrator cushion 2, which can be seen in cross section in FIG. 2 (see also FIGS. 1B, 1C). The concentrator cushion 2 has a cover film element 3″ comprising a light-permeable entry window 3 for coupling in solar radiation and a reflector film 6, which is curved in the operating state and which sub-divides the concentrator cushion 2 into at least two hollow spaces 4, 5, for the concentration of solar radiation in an absorber 1′. The reflector film 6 has a reflecting surface 6′, which focuses the coupled-in solar radiation in the direction of the absorber 1′. The absorber 1′, which is to also be understood as a solar panel, is located in the focus area of the reflecting surface 6' inside the upper hollow space 4, which connects to the entry window 3, of the concentrator cushion 2. In particular a pipe, through which a medium flows, or a photovoltaic element can be provided as absorber 1'. The concentrator can thus be used for concentrated photovoltaics (CPV=concentrated photovoltaics) as well as for thermal concentrated solar power (CSP=thermal concentrated solar power). During operation of the concentrator, a pressure difference is formed in the gas-filled hollow spaces 4, 5, whereby the reflector film 6 is curved evenly concavely, so that the coupled-in solar radiation is focused in the absorber 1' by the reflecting surface 6'. In the state, in which the hollow spaces 4, 5 are filled with compressed air, the concentrator cushion 2 is on principle designed in a self-supporting manner, so that a significantly lower weight can be realized as compared to common solar concentrators. As is known in the prior art, the concentrator cushion 2 is made up of individual thin-walled (plastic) films; a transparent film is provided for the entry window 3.

As can further be seen from FIGS. 1A to 1C, a pivoting apparatus 7 for pivoting the concentrator cushion 2 is provided. The pivoting apparatus 7 has a plurality of pivoting elements in the form of pivoting rings 8, which surround the concentrator cushion 2 in its circumferential direction. Together, the pivoting rings 8 of the pivoting apparatus 7 form a tracking system, so that the concentrator cushion 2 can track the sun's path during operation. For this purpose, the pivoting rings of the pivoting apparatus 7 are set up to support the concentrator cushion 2 so as to be pivotable about at least one axis of the concentrator cushion 2, here specifically the longitudinal axis of the concentrator cushion 2.

As can further be seen from FIGS. 1A 1B. 1C, and 2, provision is furthermore made for an anchoring apparatus 9 for the pivoting apparatus 7, wherein, in the shown embodiment, the anchoring apparatus 9 has a suspension apparatus 10 for suspending the pivoting rings 8 of the pivoting apparatus 7. The suspension apparatus 10 has a plurality of support frames 11, which are arranged so as to be spaced apart in the longitudinal direction 2''' of the concentrator cushion 2 (see FIG. 1C) and which have securing locations for the pivoting rings 8 of the pivoting apparatus 7. The securing locations are arranged above a plane 7' (see FIG. 2), which has the center of mass, of the pivoting rings 8. Each support frame 11 has a first frame element 12 on the one longitudinal side of the concentrator cushion 2, and a second frame element 13 on the other longitudinal side of the concentrator cushion 2. In addition, the support frame 11 has a third frame element 14 above the pivoting rings 8 comprising the concentrator cushion 2. The first frame element 12 on the one longitudinal side of the concentrator cushion 2 is connected to the second frame element 13 on the other longitudinal side of the concentrator cushion 2 via the third frame element 14. According to this, the support frame 11 extends in a curved manner from the one longitudinal side of the concentrator cushion 2 over the concentrator cushion 2 to the other longitudinal side of the concentrator cushion 2.

As can further be seen from FIGS. 1A 1B 1C, and 2, the first frame element 12 and the second frame element 13 in each case consist of a first straight or linear frame part 12a, 13a, respectively, and of a second straight or linear frame part 12b, 13b, respectively. The first frame part 12a, 13a is arranged substantially vertically in the operating state, wherein the lower end of the first frame part 12a, 13a is assembled in a base element 27. The second frame part 12b, 13b is angled inwardly from the upper end of the first frame part 12a, 13a towards the concentrator cushion 2.

As can further be seen from FIGS. 1A 1B 1C, and 2, the first frame element 12, the second frame element 13, and the third frame element 14 are embodied as elongated profile elements, which, in the shown embodiment, have an I-shaped cross section. The frame elements 12, 13, 14 are arranged in a plane substantially vertically to the longitudinal direction of the concentrator cushion 2.

As can further be seen from FIGS. 1A to 1C, the suspension apparatus 10 has a plurality of, in the shown embodiment three, support frames 11, which are connected to one another via a plurality of tension elements 15 in the form of rope elements. The number of the support frames 11 depends on the length of the concentrator cushion 2. The support frames 11 in each case support a pivoting ring 8, which surrounds the concentrator cushion 2. In the shown embodiment, the first frame elements 12 of the support frames 11 are clamped (braced) with one another on the one longitudinal side of the concentrator cushion 2 via tension elements 15 on the one hand, on the other hand, provision is made for tension elements 15 between the second frame elements 13 of the support frames 11 on the other longitudinal side of the concentrator cushion 2. In the shown embodiment, two tension elements 15 are clamped crosswise between the support frames 11 on both longitudinal sides. The front support frame 11' and the rear support frame 11", in each case based on the longitudinal direction of the concentrator cushion 2, are clamped on both longitudinal sides of the concentrator cushion 2 on bottom elements 17 via further tension elements 16. In the shown embodiment, the further tension elements 16 are formed by end areas of tension elements 15 between the support frames 11.

As can be seen from FIG. 2, pivot bearing apparatuses 18 in the form of roller bearings 19, 20 are provided between the suspension apparatus 10 and the pivoting rings 8. In the shown embodiment, a first roller bearing 19 is provided on the first frame element 12 of the suspension apparatus 10 and a second roller bearing 20 is provided on the second frame element 13 of the suspension apparatus 10.

Figure 3:
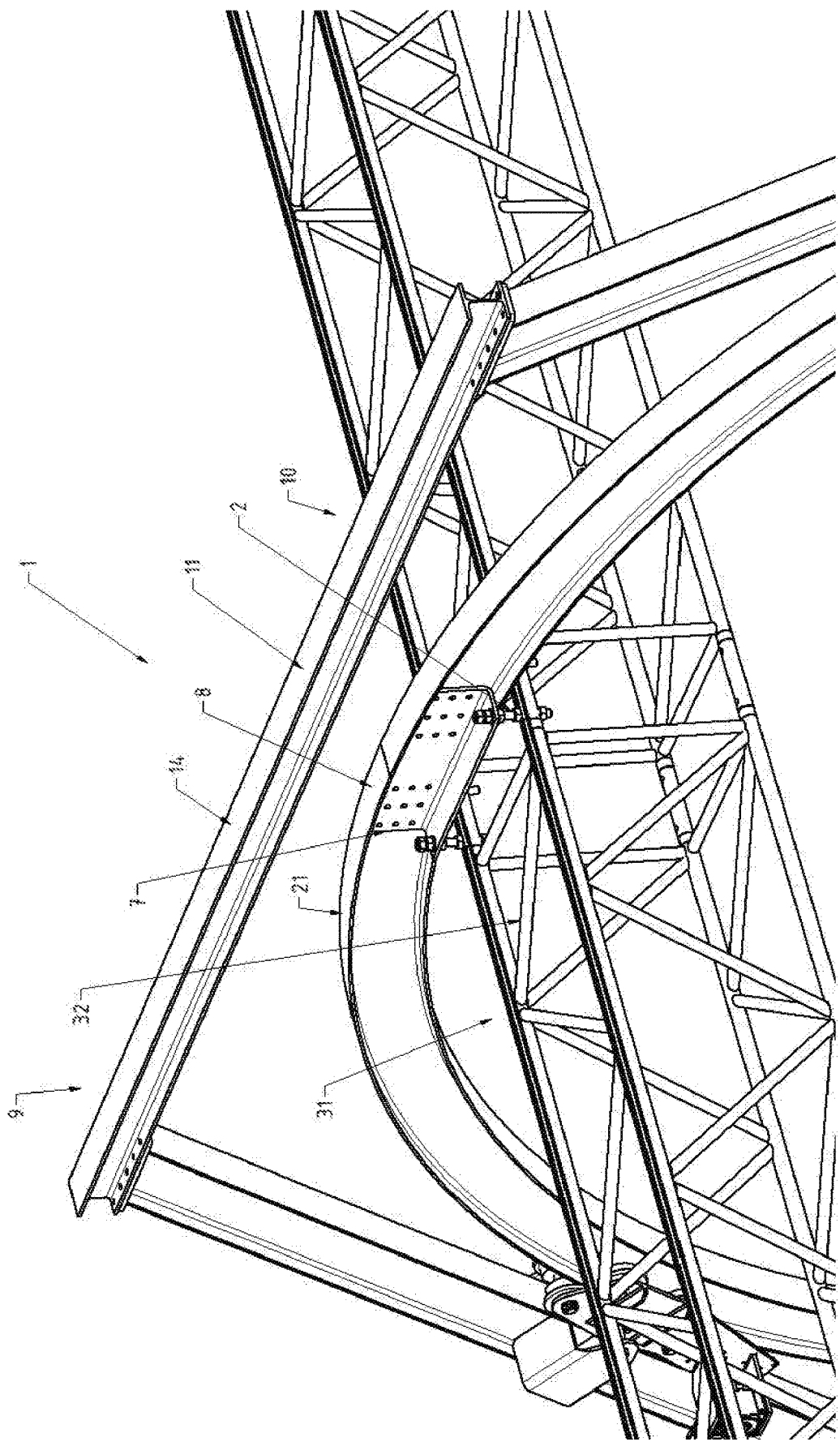
FIG. 3 shows a figurative detailed view of a section of the device according to FIGS. 1A, 1B 1C, and 2, wherein the securing of a longitudinal member, which supports the concentrator cushion, can be seen on the pivoting ring.
Figure 4B:
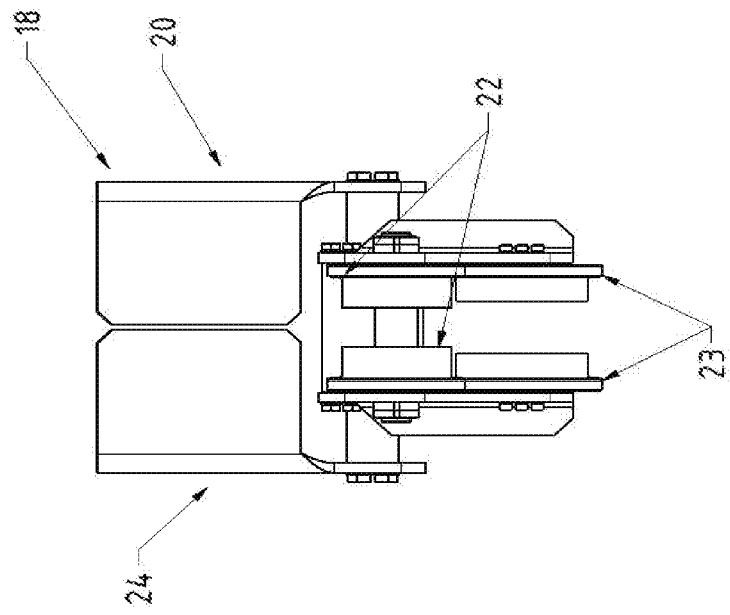
FIG. 4A and FIG. 4B in each case show a figurative view of a pivot bearing apparatus for pivoting the pivoting apparatus.
Figure 4A:
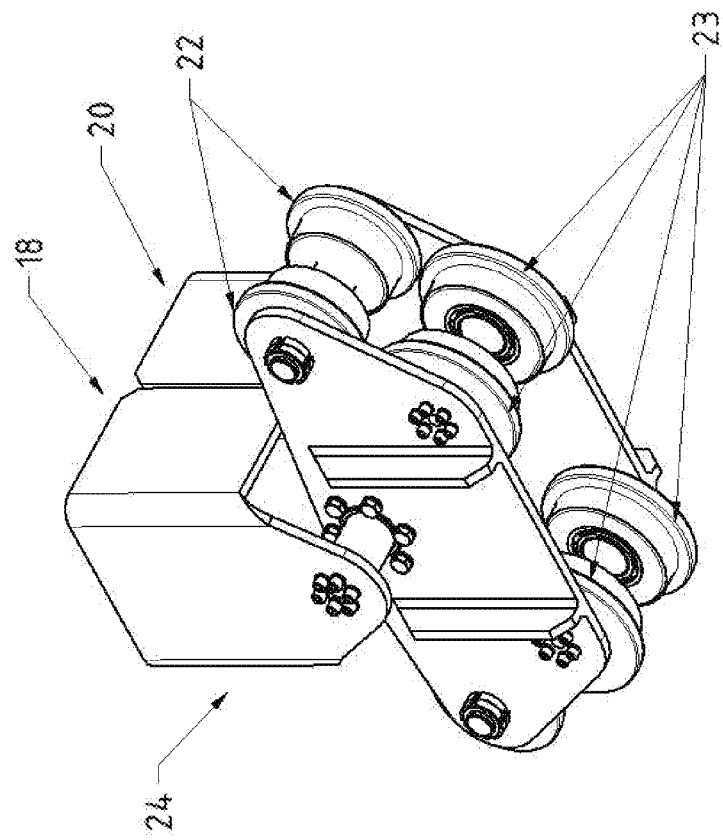

As can be seen from FIG. 3, the pivoting rings 8 in each case have a guide element 21 for the roller bearings 19, 20, wherein outer roller elements 22 roll on the top side of the guide element 21 and inner roller elements 23 roll on the inner side of the guide element 21. The roller elements 22, 23 of the roller bearings 19, 20 are assembled on travelling cranes 24, which are secured to the bottom side of the pivoting ring 8. In the shown embodiment, the pivoting rings 8 in each case have an I-shaped cross section, wherein upper flanges 25 of the I-shaped pivoting rings 8 are embodied as guide elements 21 for the roller bearings 19, 20.

As can be seen from FIG. 1B, provision is made on the suspension apparatus 10 for a covering apparatus 26, which can be transferred between a protective position, which at least partially covers the concentrator cushion 2, and a stowage position, which arranges the concentrator cushion 2 so as to be substantially completely exposed. In the shown embodiment, a plurality of covering apparatuses 26 are in each case secured between two adjacent support frames 11 on the first frame elements 12 on the one longitudinal side of the concentrator cushion 2 or on the first frame elements 13, respectively, on the other longitudinal side of the concentrator cushion 2. In the shown embodiment, the covering apparatuses 26 consist of a plurality of slat elements, which are connected to one another, and which can be transferred between a pushed-together position and a pulled-apart position. In the illustration of FIG. 1b, the two front covering apparatuses 26 are arranged in the pushed-together position, in which wind forces can act on the lower half of the concentrator cushion 2. In contrast, the two rear covering apparatuses 26 are arranged in the pulled-apart position, in which wind forces can be kept away from the lower area of the concentrator cushion 2. The covering apparatuses 26 can be transferred between the stowage position and the protective position in a motor-driven manner or manually.

As can be seen from FIGS. 1A, 1B, 1C, and 3, the device 1 also has a retaining apparatus 31 for the concentrator cushion 2, which (in each case based on the operating position) has a first (upper) longitudinal member 32 and a second (lower) longitudinal member 33. The upper longitudinal member 32 supports the absorber 1' (see FIG. 2), whereas the lower longitudinal member 33 contributes to the discharge of external loads. Both longitudinal members 32, 33 extend in the longitudinal direction of the concentrator cushion 2 between a front end piece 2' and a rear end piece 2" on the front sides of the concentrator cushion 2 (see FIG. 1C).

As can further be seen from the drawing, the upper longitudinal member 32 is suspended on the inner side to the upper area of the pivoting rings 8. The lower longitudinal member 33 is also attached on the inner side, but in the lower area of the pivoting rings 8. The upper longitudinal member 32 is connected to a top side of the concentrator cushion 2, the top side facing the solar radiation. The lower longitudinal member 33 is connected to a bottom side of the concentrator cushion 2, the bottom side facing away from the solar radiation. In the shown embodiment, the longitudinal members 32, 33 are embodied as lattice trusses. As can be seen from FIG. 2, the longitudinal members are arranged on a plane 7", which has the center point of the pivoting ring 8.

The invention claimed is:

1. A device for concentration of solar radiation in an absorber comprising:
   an inflatable concentrator cushion, which comprises a light-permeable entry window for coupling in solar radiation and a reflector film for the concentration of solar radiation in the absorber, and the reflector film sub-divides the concentrator cushion into at least two hollow spaces; and
   the device for retaining the inflatable concentrator cushion comprising a pivoting apparatus for pivoting the concentrator cushion, wherein the pivoting apparatus comprises at least one pivoting element which surrounds the concentrator cushion in its circumferential direction, and comprising an anchoring apparatus for anchoring the pivoting apparatus, wherein the anchoring apparatus comprises a suspension apparatus for suspending the pivoting apparatus.

2. The device according to claim 1, wherein the suspension apparatus comprises at least one support frame, which is arranged so as to be spaced apart in a longitudinal direction of the concentrator cushion, wherein the at least one support frame in each case comprises at least a first frame element on one longitudinal side of the concentrator cushion and a second frame element on another longitudinal side of the concentrator cushion.

3. The device according to claim 2, wherein the support frame comprises a third frame element above the concentrator cushion, which connects the first frame element on the one longitudinal side of the concentrator cushion to the second frame element on the other longitudinal side of the concentrator cushion.

4. The device according to claim 3, wherein the first frame element and/or the second frame element and/or the third frame element are embodied as profile elements, in particular as I-profiles, which extend in a plane substantially vertically to the longitudinal direction of the concentrator cushion.

5. The device according to claim 3, wherein the first frame element and/or the second frame element is assembled of at least a first straight frame part and a second straight frame part, which are arranged relative to one another at an angle.

6. The device according to claim 5, wherein the first straight frame part is arranged substantially vertically in an operating state, wherein the first straight frame part is anchored on a lower end in a base element.

7. The device according to claim 2, wherein the suspension apparatus comprises at least two support frames, which are connected to one another via at least one tension element, in particular a rope element.

8. The device according to claim 7, wherein at least one support frame, in particular a front support frame, based on the longitudinal direction of the concentrator cushion, and/or a rear support frame, based on the longitudinal direction of the concentrator cushion, is braced against a bottom element via a further tension element.

9. The device according to claim 7, wherein the at least two support frames are connected to one another on both longitudinal sides of the concentrator cushion via at least one tension element each.

10. The device according to claim 9 wherein the at least two support frames are connected to one another in each case via at least two tension elements which are clamped crosswise.

11. The device according to claim 1, wherein the at least one pivoting element comprises a pivoting ring, wherein a plurality of pivoting elements, in particular pivoting rings, which are spaced apart in the longitudinal direction of the concentrator cushion, are in each case suspended on a support frame of the suspension apparatus.

12. The device according to claim 1, wherein provision is made between the suspension apparatus and the pivoting apparatus for a pivot bearing apparatus, in particular a roller bearing.

13. The device according to claim 12, wherein the pivot bearing apparatus comprises a first roller bearing on the first frame element of the suspension apparatus and a second roller bearing on the second frame element of the suspension apparatus.

14. The device according to claim 12, wherein the pivoting apparatus comprises a guide element for the roller bearing, wherein provision is made for an outer roller element to roll on a top side of the guide element and for an inner roller element to roll on an inner side of the guide element.

15. The device according to claim 12, wherein the pivoting apparatus comprises at least one pivoting element comprising an I-shaped or T-shaped cross section, wherein an upper flange of the I-shaped or T-shaped pivoting element is embodied as guide element for the roller bearing.

16. The device according to claim 1, wherein provision is made on the suspension apparatus for a covering apparatus, which can be transferred between a protective position, which at least partially covers the concentrator cushion, and a stowage position, which arranges the concentrator cushion so as to be substantially completely exposed.

17. The device according to claim 1, wherein the pivoting apparatus is connected to a retaining apparatus for the concentrator cushion, which comprises at least one longitudinal member, in particular lattice truss, which extends in the longitudinal direction of the concentrator cushion.

18. The device according to claim 17, wherein the retaining apparatus for the concentrator cushion comprises a first longitudinal member, in particular a first lattice truss, and a second longitudinal member, in particular a second lattice truss, wherein the first longitudinal member is connected to a top side of the concentrator cushion, the top side facing the solar radiation, and the second longitudinal member is connected to a bottom side of the concentrator cushion, the bottom side facing away from the solar radiation.

* * * * *